C. W. GRAHAM.
MACHINE FOR FUSING CAN SEAMS.
APPLICATION FILED DEC. 26, 1911.
1,152,411.
Patented Sept. 7, 1915.
2 SHEETS—SHEET 1.
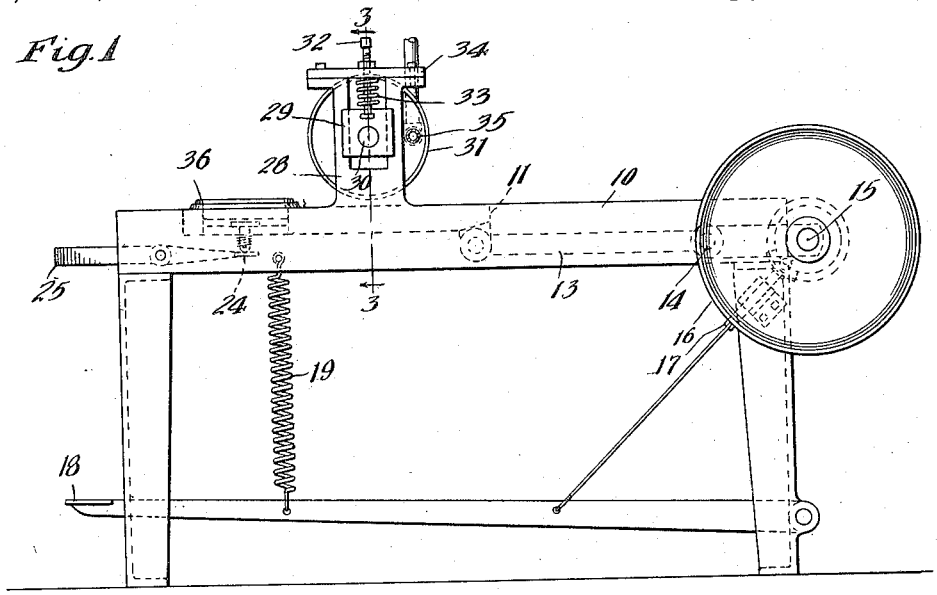
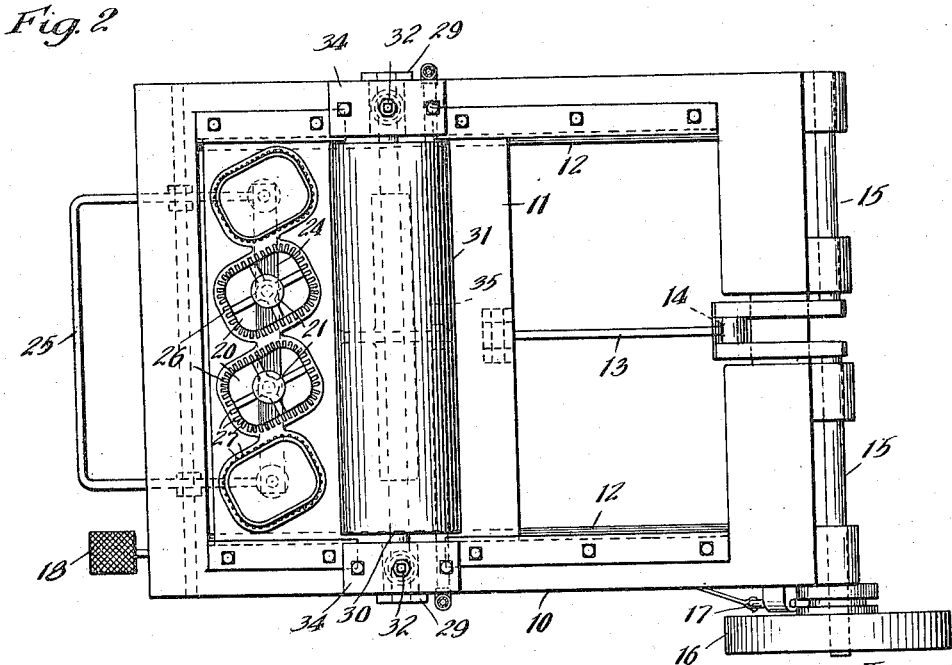
Witnesses:
Wm. Geiger
H. W. Munday
Inventor:
Charles W. Graham
By Munday, Evarts, Adcock & Clark
Attys

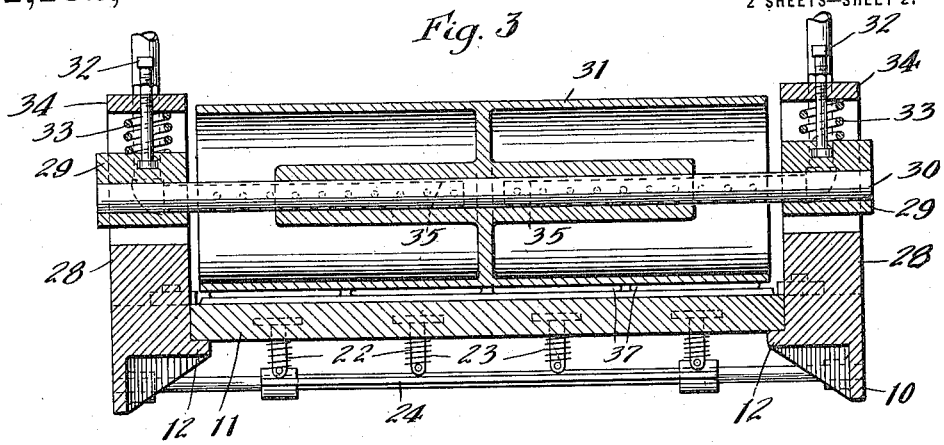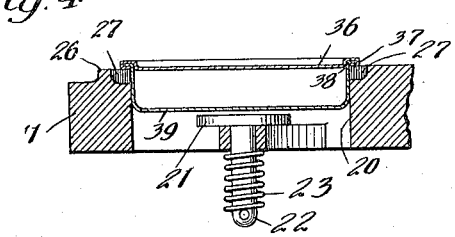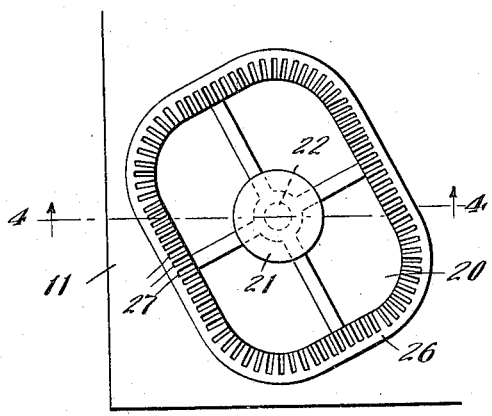

UNITED STATES PATENT OFFICE.

CHARLES W. GRAHAM, OF NEW YORK, N. Y., ASSIGNOR TO AMERICAN CAN COMPANY, OF NEW YORK, N. Y., A CORPORATION OF NEW JERSEY.

MACHINE FOR FUSING CAN-SEAMS.

1,152,411.  Specification of Letters Patent.  Patented Sept. 7, 1915.

Application filed December 26, 1911. Serial No. 667,779.

*To all whom it may concern:*

Be it known that I, CHARLES W. GRAHAM, a citizen of the United States, residing in New York, in the county of New York and State of New York, have invented a new and useful Improvement in Machines for Fusing Can-Seams, of which the following is a specification.

This invention relates to machines for soldering the seams or joints of cans or other sheet metal articles.

The object of the invention is to provide a simple, efficient and durable machine, by means of which the soldering may be done with a minimum amount of solder, and whereby at the same time, hermetically tight solder joints may be produced with certainty and uniformity, whether the cans being operated upon are filled or empty, and by means of which all danger of leaks or pin holes being produced by steam or gases under pressure in the can tending to force a way out through the fused or setting solder, may be entirely eliminated.

The means which I have shown for carrying out the above named objects and herein shown and described, but which may be greatly varied, consists in the combination with a heated pressure device by means of which heat and pressure may be applied continuously and progressively to one side of the members of a seam or joint to be united by the solder, of an opposing interrupted, progressive cooling pressure device or holder for the can or article, the seam of which is to be soldered, and which engages and contacts with the seam at spaced points on the opposite side from that contacted by the heated pressure device, the cooling pressure device being preferably mounted upon or forming part of a movable carrier by which the can or article is conveyed beneath the heated pressure device. The heated pressure device is preferably in the form of a hollow, cylindrical roller, and is heated by a gas or other burner by which flame may be projected to the interior of the roller.

It will be apparent that my machine is adapted to operate on various forms and shapes of cans, having various forms of seams, but it is particularly adapted for use in connection with rectangular cans having a seam formed between the body and cover flanges, in which one of the flanges, preferably that of the cover, is turned around or tucked over the body flange, and wherein also the coating of solder has previously been fusibly united with one or the other of the seaming flanges, preferably to the body flange. The cans with the covers tucked or clenched to the bodies, as in the manner stated above, are placed in the holder or cooling pressure device, and the latter is then passed beneath the roller and the cans subjected to heat and pressure. The cooling pressure surface or device is preferably in the form of a die or block within which the can body is adapted to be seated, and which has a surrounding, preferably raised, rim or ledge conforming to the shape of the seam and upon which the latter rests. This rim or ledge is uniformly slotted, the slotted portions approximately equaling one half of the entire rim or ledge. These slots are comparatively small, being in actual practice, approximately one-thirty-second of an inch in width, but in any case, never so wide as to allow the seam flanges to be depressed therein while passing under the heating and upper pressure device. In other words, the cooling slotted pressure surface has the solid portions thereof near enough together so that the strength of the seaming flanges will be sufficient to prevent the portions of the flanges which bridge the gaps, from sagging. In this way the heated pressure roller, in conjunction with the coöperating cooling pressure device, will always hold the two or more members forming the seam in close contact with each other while under the roller and entirely free from crevices or vacant spaces between them, so that perfect soldering may be effected by this means.

By applying heat to the seam, point by point or minute seam area after minute seam area, the least amount of heat is transmitted to the body of the can or its contents or to the portions thereof adjacent the seam, and the soldering takes place without any tendency to produce steam or other gases within the can or to expand those gases already within the can, and the danger of escaping gas or steam producing pin holes and leaks is eliminated. It is essential, however, that the points or minute areas be cooled almost simultaneously after they are heated, and the solder fused by the heated pressure roller, and it is for this reason that the lower cooling pressure surface is slotted or cut away as much as possible, as I have found that by so constructing the supporting rim or ledge, the heat is much more rapidly dissipated than in those machines which employ a continuous cooling pressure surface. By slotting and cutting away the cooling pressure surface or rim, a greater amount of radiating or cooling surface for the cooling pressure device is obtained, and in the structure which I have shown, the cooling or radiating surface is increased approximately two hundred per cent. By this means also, air is allowed to circulate in the slots and comes in direct contact with approximately half of the underside of the seams and portions of the can body.

In soldering the seams of rectangular cans, such, for example, as sardine cans, the heating roller and coöperating can holder or cooling pressure device are preferably so arranged as to cause the roller to occupy a diagonal position in respect to the seam, so that the corner portions of the seam will be the first and last portions to be fused and set, which is an advantage, since it allows any surplus liquid within a filled can to be pressed out or escape at the final corner portion of the seam being formed, and thus prevents the escaping liquid from interfering with the fusing and soldering operation until the very last portion of the seam is closed.

I have shown my invention as embodied in an intermittently operating machine, but it is apparent that my improvements embodying a continuously, progressively operating heated pressure device and an interrupted, progressively operating cooling pressure device may be utilized in other forms of machines.

My invention furthermore consists in the improvements in the parts and devices and in the combinations of the parts and devices herein shown, described and claimed.

In the accompanying drawings forming a part of this specification, Figure 1 is a side elevation of a structure embodying my improvements. Fig. 2 is a plan view of the structure shown in Fig. 1. Fig. 3 is a detail, transverse section, on an enlarged scale, taken substantially on the line 3—3 of Fig. 1. Fig. 4 is a detail, sectional view of one of the can body pockets in the lower cooling pressure device, taken on the line 4—4 of Fig. 5, and Fig. 5 is a plan view of one of the lower, interrupted, cooling pressure devices.

In the drawings, 10 denotes any suitable framework adapted to support the various parts of the machine. Mounted in the framework is a slide 11 adapted to reciprocate on ways 12, said slide 11 being operated as by means of a link 13 and crank 14 from a power shaft 15. The shaft 15 is driven from any suitable source of power, as by means of the pulley 16 adapted to rotate the shaft 15 intermittently, as by means of a clutch 17 operated from a foot treadle 18, which is normally retracted as by means of a spring 19. The slide 11 is provided with a plurality of pockets or recesses 20, shaped to conform with the can bodies being operated upon, and preferably located in each of these can body pockets 20 is an ejector 21 having a stem 22 and normally held depressed by a spring 23. The slide 11, when in its position nearest the front end of the machine has the ejectors 22 disposed over a lever 24, pivoted to the frame 10 and adapted to be operated as by means of the handle 25. The lever 24 operates all of the ejectors simultaneously, as will be apparent. Each can body pocket or recess 20 has at its upper edge a raised portion or rim 26 upon which the seam being fused is adapted to rest. Each of the rims or ridges 26 is provided with a series of slots 27, equally spaced around the upper mouth of the can body pocket, and the width of the slots is preferably so made that the amount of slotted portions equals approximately the amount of solid surface. The ridge or raised portion 26 serves as a lower, intermittent cooling pressure surface for the under portion of the seam being fused, and as will be evident, allows a free circulation of air beneath the seam, said air being also adapted to contact with portions of the upper end of the can body proper. Mounted in standards 28 are slidable bearing blocks 29, having mounted therein a shaft 30, keyed to which is a roller 31, said roller serving as a combined fusing and pressure means for operating on the seams. The bearing blocks 29 are adjustably mounted, as by means of bolts 32 swiveled in the blocks 29, and the roller 31 is held in engagement with the cans being operated upon resiliently, as by means of the springs 33, which are located intermediate the blocks 29, and cross members 34 secured to the top of each of the standards 28. The roller 31 is heated by any suitable means, such, for instance, as gas burners 35 located within the hollow roller 31. The combined fusing and pressing roller 31 engages the upper side of the seam being fused progressively and continuously, and will operate upon only a minute area of the seam at a time. The pockets 20 are so arranged, when rectangular or sardine cans are being operated upon, that the cans are presented diagonally to the roller 31.

My machine has been designed particularly to operate on sardine cans each having a cover 36 having its flange 37 folded around and tucked under the flange 38 of the body 39, and the solder is preferably fusibly united to the upper side of the flange 38 before the cover is secured to the can body.

But it will be obvious that other types of cans may be operated upon without departing from the spirit of my invention.

In operation, the can bodies with the covers attached thereto, are placed in the pockets by hand, and the foot treadle 18 then depressed, whereupon the slide 11 with the can bodies therein, reciprocates and passes the cans beneath the roller 31 in one direction, and then returns to its initial position, thus passing the cans a second time beneath the fusing roller. The seams are thus twice subjected to the fusing action, and in this way an hermetic seal is practically assured.

I claim—

1. In a solder fusing machine, the combination with a heated pressure member, of an opposing cooling pressure device conforming in shape and size to the seam being fused and engaging spaced non-continuous portions of one side of the seam where the seam projects beyond the can body, said heated pressure member acting progressively on successive portions of the other side of the seam, substantially as specified.

2. In a solder fusing machine, the combination with a heated fusing and pressure roller, of an opposing, cooling pressure device conforming in shape to the seam, said roller acting progressively and continuously on successive portions on one side of the seam, and said cooling pressure device having an interrupted surface engaging the opposite side of the seam.

3. In a solder fusing machine, the combination with a heated fusing pressure roller, of a can holder pressure device adapted to pass beneath the roller and having a recess therein adapted to fit and receive a can, said holder having a portion conforming in shape to the seam and upon which the latter is adapted to be supported, said portion of the holder being slotted on its upper face.

4. In a machine of the class described, in combination: a frame; a heated pressure roller mounted on said frame; a reciprocating cooling pressure device having a can body holding pocket therein; means for reciprocating the cooling pressure device; and an ejector having means whereby it is operable on the return movement of the reciprocating device to remove can bodies from the said pocket, substantially as specified.

5. In a machine of the class described, in combination, a frame, a heated pressure roller, a reciprocating slide provided with a can body holder, said holder serving as a cooling pressure device, and means for reciprocating said slide, said roller acting continuously and the cooling pressure device acting upon spaced portions of the seam.

6. In a machine of the class described, in combination, a frame, a combined heating and pressure roller, a slide reciprocable in the frame, said slide being adapted to receive and retain a can body, and also serving as a cooling pressure device for the seam to be fused, said slide having a slotted, raised portion conforming in shape to the seam being fused, and means for reciprocating said slide.

7. In a machine of the class described, in combination, a frame, a combined pressure and fusing roller, a slide adapted to be reciprocated in said frame, said slide being provided with a plurality of transversely alined cooling pressure devices having means for supporting and pressing the outstanding can seam beyond the can body, and means for reciprocating said slide.

8. In a machine of the class described, in combination, a frame, a fusing roller, a reciprocating slide, said slide being provided with a plurality of can body pockets, means for reciprocating said slide, a can ejector in each of said can body pockets, and means for operating all of said ejectors simultaneously.

9. In a machine of the class described, in combination, a frame, a reciprocating slide, a roller, a gas burner located within said roller, said slide being provided with a can body pocket shaped to conform to the can body, said slide being furthermore provided with a slotted raised rim around the upper edge of the can body pocket.

10. In a machine of the class described, in combination, a frame, a reciprocating slide mounted therein, a roller mounted above said slide, said slide being provided with a plurality of can body pockets shaped to conform to the can bodies being fused, said slide being provided with a raised rim around each can body pocket, each of said rims being slotted, and means for reciprocating said slide intermittently.

11. In a machine of the class described, in combination, a heated presure device, a can holder cooling pressure device, and means for moving said cooling pressure device under the heated pressure device twice during a complete cycle of operations of the machine, substantially as specified.

CHARLES W. GRAHAM.

Witnesses:
 W. D. Foster,
 Walter Henry.